(12) United States Patent
Wandeloski et al.

(10) Patent No.: US 6,436,156 B1
(45) Date of Patent: Aug. 20, 2002

(54) ZINC/AIR CELL

(75) Inventors: William J. Wandeloski, Weymouth; Gary M. Searle, Norfolk; Vance Roger Shepard, Lancaster; William T. McHugh, Westwood, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/578,549

(22) Filed: May 25, 2000

(51) Int. Cl.⁷ ................................................ H01M 6/00
(52) U.S. Cl. ...................... 29/623.2; 429/162; 429/209; 429/229; 429/27
(58) Field of Search ................................ 429/229, 209, 429/162, 27; 29/623.2

(56) References Cited

U.S. PATENT DOCUMENTS 4,041,211 A * 8/1977 Wiacek ........................ 429/27

FOREIGN PATENT DOCUMENTS

| JP | 58-30065 | 2/1983 |
| JP | 58-32377 | 2/1983 |
| JP | 58-220369 | 12/1983 |
| JP | 60-49578 | 3/1985 |
| JP | 63-281368 | 11/1988 |
| JP | 9-129204 | 5/1997 |

* cited by examiner

Primary Examiner—Laura Weiner
(74) Attorney, Agent, or Firm—Barry D. Josephs; Paul I. Douglas; Thomas G. Krivulka

(57) ABSTRACT

A zinc/air button cell having an adhesive sealant applied to a portion of the inside surface of the cell's cathode casing. The adhesive sealant can be applied to the inside surface of a recessed annular step surrounding the cell's positive terminal on the cathode casing. The adhesive is preferably applied in a pattern which conforms to the shape of the annular recessed step. An electrolyte barrier sheet, preferably of Teflon, can be applied to the adhesive pattern on the inside surface of said recessed step, preferably so that the adhesive bonds the edge of the barrier sheet to the step. The adhesive prevents electrolyte from leaking from the cell. The adhesive is applied preferably by preparing a plate having a desired pattern etched thereon, filling the etching in the plate with an adhesive mixture, applying a silicon pad to the etching to transfer the adhesive pattern to the pad, then applying the pad to the inside surface of the cathode casing step to transfer the adhesive pattern thereto. The adhesive is preferably a solvent based mixture comprising a polyamide.

28 Claims, 5 Drawing Sheets

ZINC/AIR CELL

FIELD OF THE INVENTION

The invention relates to a metal/air cell having an anode comprising zinc and an air cathode and having an adhesive sealant between a portion of the cathode and the cathode casing. The invention also relates to a pad transfer process of applying the adhesive sealant to a portion of the inside surface of the cathode casing.

BACKGROUND

Zinc/air depolarized cells are typically in the form of a miniature button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size Zn/$MnO_2$ alkaline cells and even larger sizes.

The miniature zinc/air button cell typically comprises an anode casing (anode cup), and a cathode casing (cathode cup). The anode casing and cathode casing each can have a closed end an open end. After the necessary materials are inserted into the anode and cathode casings, the open end of the anode casing is typically inserted into the open end of the cathode casing and the cell sealed by crimping. The anode casing can be filled with a mixture comprising particulate zinc. Typically, the zinc mixture contains mercury and a gelling agent and becomes gelled when electrolyte is added to the mixture. The electrolyte is usually an aqueous solution of potassium hydroxide, however, other aqueous alkaline electrolytes can be used. The closed end of the cathode casing (when the casing is held in vertical position with the closed end on top) typically has a raised portion near its center. This raised portion forms the positive terminal and typically contains a plurality of air holes therethrough. The cathode casing closed end also typically has an annular recessed step which surrounds the positive terminal.

The cathode casing contains an air diffuser (air filter) which lines the inside surface of the raised portion (positive terminal contact area) at the casing's closed end. The air diffuser can be selected from a variety of air permeable materials including paper and porous polymeric material. The air diffuser is placed adjacent air holes in the raised portion of the casing closed end. Catalytic material typically comprising a mixture of particulate manganese dioxide, carbon and hydrophobic binder can be inserted into the cathode casing over the air diffuser on the side of the air diffuser not contacting the air holes. A cathode catalytic assembly can be formed by laminating a layer of electrolyte barrier material (hydrophobic air permeable film), preferably Teflon (tetrafluoroethylene), to one side of the catalytic material and an electrolyte permeable (ion permeable) separator material to the opposite side. The cathode catalytic assembly is then typically inserted into the cathode casing so that its central portion covers the air filter and a portion of the electrolyte barrier layer rests against the inside surface of the step.

In high drain or other demanding service electrolyte can migrate to the edge of the catalytic cathode assembly and leakage of electrolyte from the cathode casing can occur. The leakage, if occurring, tends to occur along the peripheral edge of the cathode catalytic assembly and the cathode casing and then gradually seep from the cell through the air holes at the cathode casing closed end. The potential for leakage is also greater when the cathode casing is made very thin, for example, having a wall thickness of about 0.01 inches (0.25 mm) and lower, for example to 0.05 mm. Such low wall thickness is desirable, since it results in greater internal cell volume. However, there is a greater tendency for the thin walled cathode casing to relax after the cell is closed by crimping. Such casing relaxation can result in the development or enlargement of microscopic pathways between the cathode catalytic assembly and the inside surface of cathode casing step, in turn providing a pathway for electrolyte leakage.

The cathode casing can typically be of nickel plated stainless steel, for example, with the nickel plate forming the cathode casing's outside surface and stainless steel forming the casing's inside surface. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An insulator ring of a durable, polymeric material can be inserted over the outside surface of the body of the anode casing. The insulator ring is typically of high density polyethylene, polypropylene or nylon which resists flow (cold flow) when squeezed.

After the anode casing is filled with the zinc/electroyte mixture and after the air diffuser, catalyst, and electrolyte permeable (ion permeable) separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal.

It is desired to produce a zinc/air cell which has a tight seal between the cathode assembly and the cathode casing.

It is desired to produce a zinc/air cell which prevents leakage of electrolyte around the edge of the cathode assembly and escaping through air holes in the cathode casing.

SUMMARY OF THE INVENTION

An aspect of the invention is directed to a process for applying an adhesive sealant to a portion of the inside surface of a cathode casing for a zinc/air cell. The zinc/air cell is typically in the form of a miniature button cell. Such miniature button cells have particular application as a power source for electronic hearing aids. The adhesive is preferably applied to the inside surface of a recessed step which surrounds a central positive terminal on the cell's cathode casing at the closed end of the casing. The adhesive sealant prevents leakage of electrolyte from the cell. If the closed end of the cathode casing is flat, that is, does not have a recessed step, the adhesive sealant can be applied to the inside surface of the closed end adjacent the outer peripheral edge thereof.

The process of the invention involves the steps of preparing an etched or grooved surface on a plate, filling the etching or grooves on the plate with an adhesive mixture to form an adhesive pattern, applying a silicon pad to the adhesive pattern on the plate whereby the adhesive pattern transfers to the pad, then applying the pad to a portion of the inside surface of the cathode casing, whereby the adhesive pattern transfers to the inside surface of the cathode casing as the pad is lifted from the surface. The cathode casing preferably has an annular recessed step surrounding the positive terminal on the cathode casing. The adhesive pattern is preferably transferred from the pad to the inside surface of said annular recessed step surrounding the positive terminal on the cathode casing. The transferred adhesive pattern is preferably in the form of a continuous ring conforming to the shape and size of the recessed step, typically a circular ring. Thus, the adhesive pattern can desirably be applied to the inside surface of the annular step as a continuous ring contacting and tracing the inside surface of the step. The adhesive pattern has a width which can be the same as the width of said recessed step desirably between about one third to two thirds of the width of the step. Thus the adhesive preferably covers a large portion of the inside surface of the step preferably most of the inside surface of the step. The adhesive is applied to the step so that it has a small uniform thickness. The thickness of the adhesive pattern (wet) transferred to the cathode casing step is about the same as the depth of the etching, preferably between about 20 and 40 micron (0.020 and 0.040 millimeter). If the etching is too shallow the pad will not pick up enough of the adhesive; if the etching is too deep the pad will only pick up a portion of the adhesive material. A desirable depth range for the etching is between about 20 and 40 micron (0.020 and 0.040 mm). Preferably the thickness of the transferred adhesive is about 30 micron (0.030 mm) (wet) and about 7 micron (0.007 mm) (dry).

In one aspect an electrolyte barrier sheet is applied to the adhesive ring on the inside surface of said recessed step, preferably so that the edge of the sheet adheres to the adhesive. The barrier sheet has the property that it is hydrophobic, that is, not permeable to water and alkaline electrolyte, yet it is permeable to air. A preferred barrier sheet is a sheet of Teflon (tetrafluoroethylene). The adhesive ring forms a permanent bond between the barrier sheet and the recessed step. A catalytic cathode assembly comprising a catalytic cathode layer typically comprising a mixture of manganese dioxide, carbon and binder is applied over the electrolyte barrier sheet so that the barrier sheet is between the cathode assembly and the positive terminal. The cathode assembly can include an electrolyte permeable separator placed over the catalytic cathode layer. The separator separates the cathode assembly from the anode mixture comprising zinc and alkaline electrolyte within the cell's interior. The adhesive bond between the edge of the electrolyte barrier sheet and the inside surface of the recessed step around the positive terminal provides a tight seal preventing electrolyte from seeping around the cathode assembly and leaking from the cell.

The adhesive pattern which is transferred to the inside surface of the cathode casing step by the process of the invention is preferably a solvent based polyamide adhesive mixture. A preferred adhesive mixture is formed of a low molecular weight polyamide adhesive gel or solid dissolved in solvent. A desirable molecular weight of the polyamide is between about 195 and 390 atomic mass units. The ratio of polyamide material to solvent can be adjusted so that the solution viscosity is optimized for pad transfer by the process of the invention. A preferred viscosity for the adhesive mixture employing a low molecular weight polyamide is desirably between about 1000 and 1300 centipoise, preferably about 1100 centipoise.

BRIEF DESCRIPTION OF THE DRAWINGS

The invention will be better understood with reference to the drawings in which.

DETAILED DESCRIPTION

Figure 1:
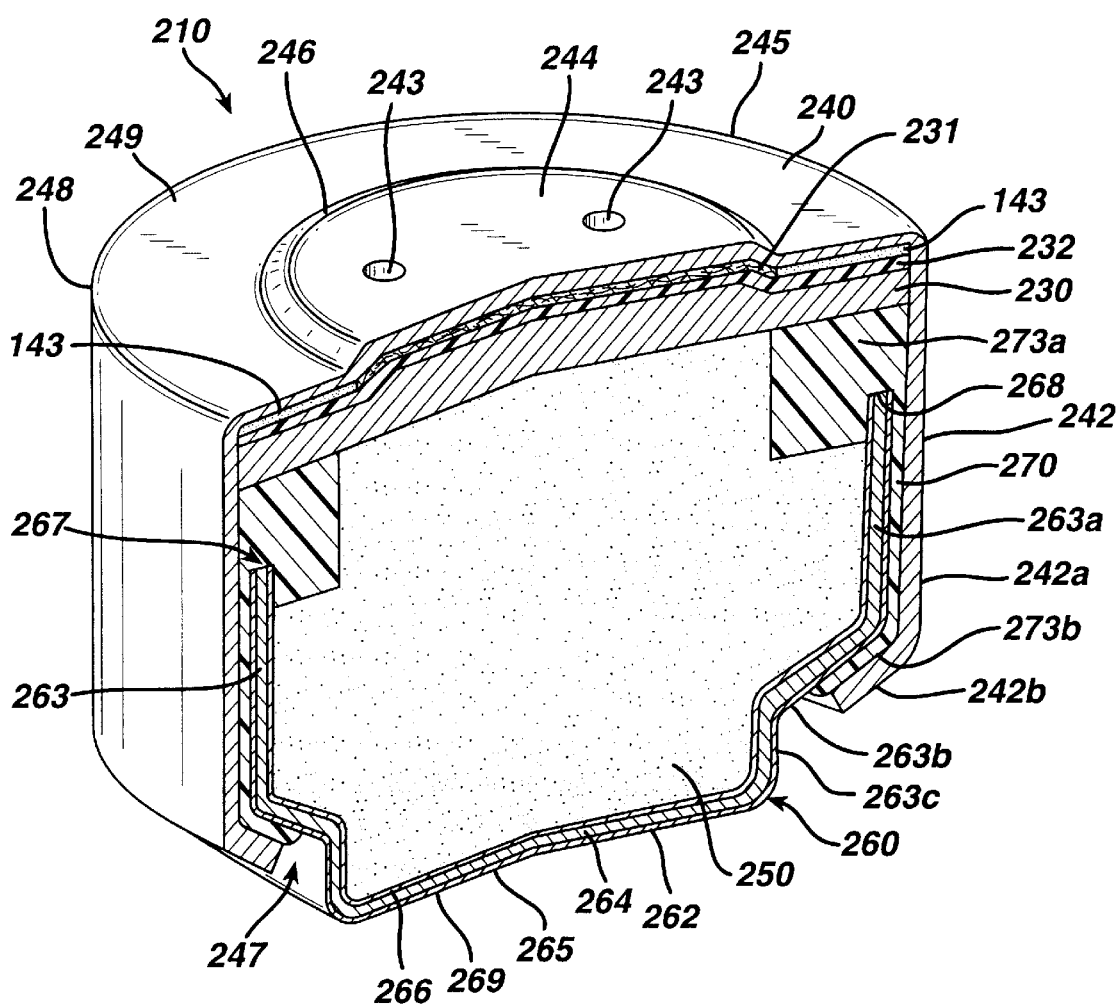
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention is desirably in the form of a miniature button cell. It has particular application as a power source for electronic hearing aids. The miniature zinc/air button cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.1 volt to 0.2 volt. The cell typically has a substantially flat discharge voltage profile between about 1.1 and about 0.9 volt whereupon the voltage can then fall fairly abruptly to zero. The miniature button cell can be discharged at a rate between about 0.2 and 20 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The cell of the invention can contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 50 parts per million parts of total cell weight, preferably less than 20 parts per million of total cell weight, more preferably less than about 10 parts per million of total cell weight. (The term "essentially mercury free" as used herein shall mean the cell has a mercury content less than about 50 parts per million parts of total cell weight.) The cell of the invention can have a very small amount of lead additive in the anode. If lead is added to the anode, the lead content in the cell can typically be between about 100 and 600 ppm of total metal content in the anode. However, the cell desirably does not contain added amounts of lead and thus can be essentially lead free, that is, the total lead content is less than 30 ppm, desirably less than 15 ppm of the total metal content of the anode.

The zinc/air cell 210 of the invention (FIG. 1) has an anode casing 260, a cathode casing 240, and electrical insulator material 270 therebetween. The anode casing 260 has body 263, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

Figure 2:
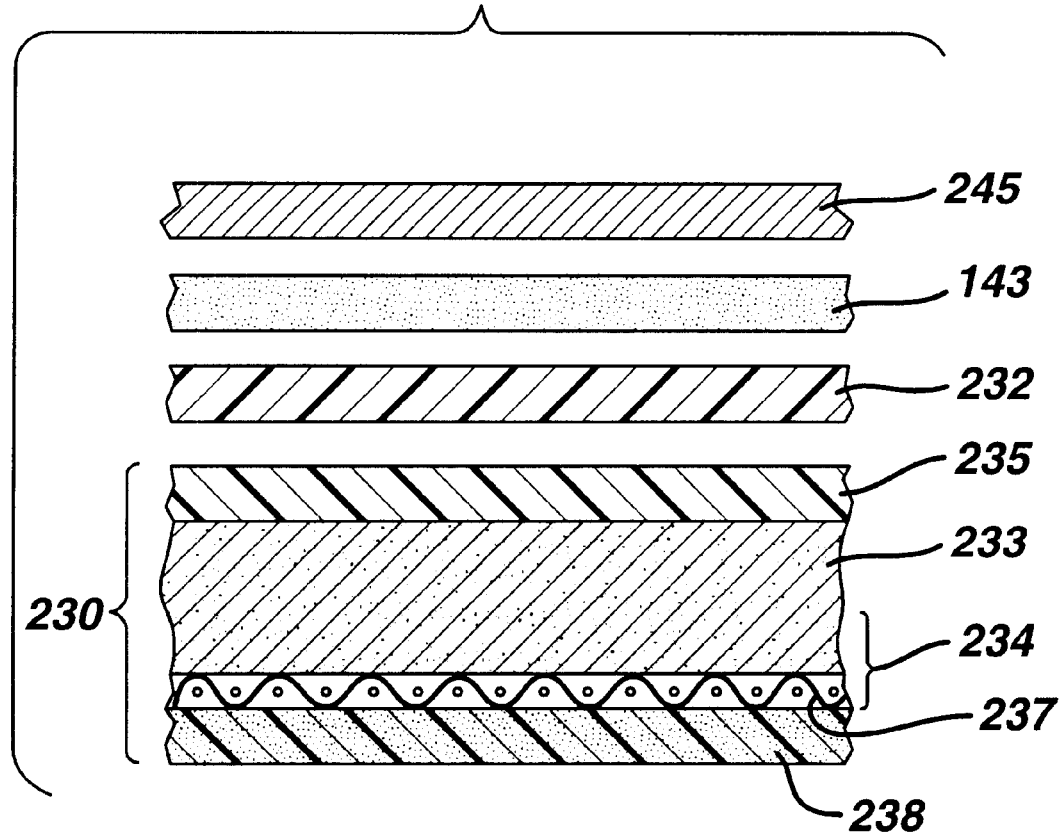
FIG. 2 is an exploded view of a preferred embodiment of the catalytic cathode assembly and adhesive sealant shown in FIG. 1.
Figure 7:
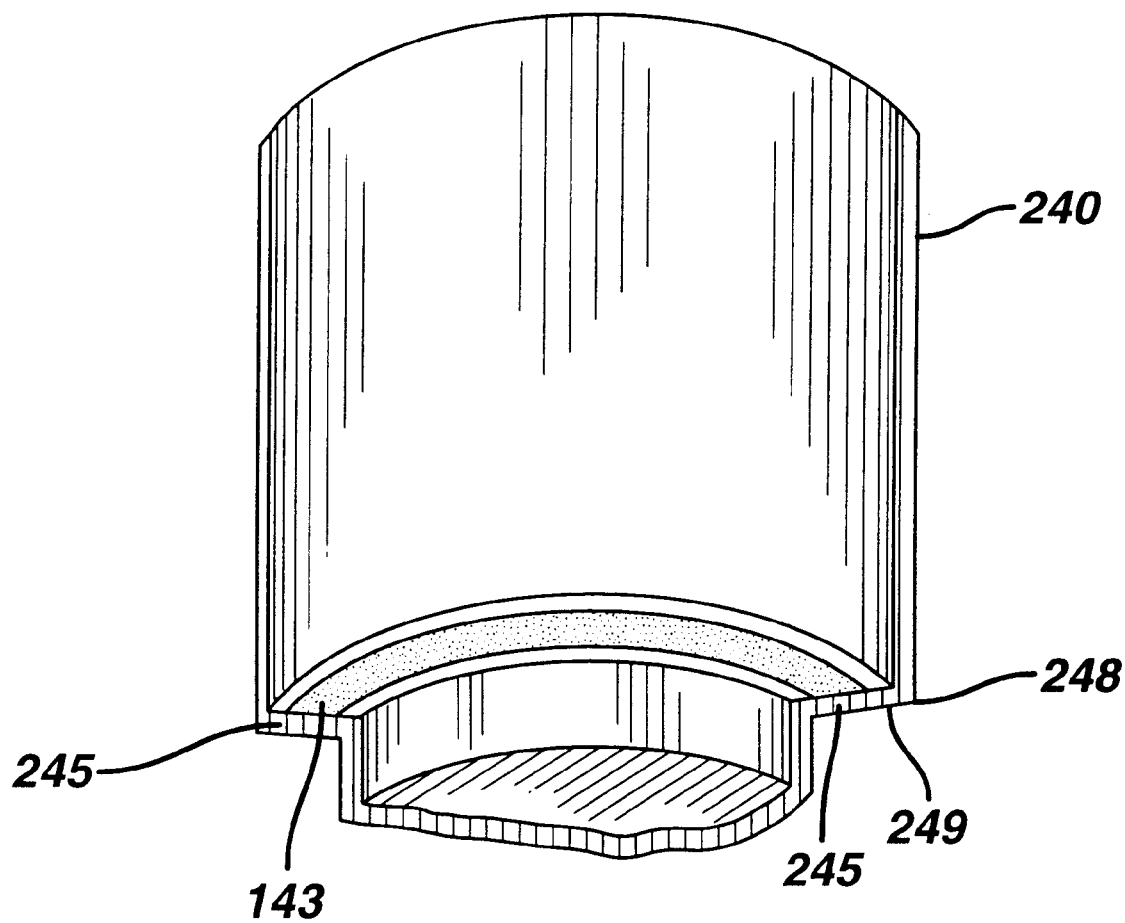
FIG. 7 is an isometric cross sectional view of the cathode casing showing the adhesive applied to the inside surface of the casing step.

The anode casing 260 contains an anode mixture 250 comprising particulate zinc and alkaline electrolyte. The particulate zinc is desirably alloyed with between about 100 and 1000 ppm indium. The cathode casing 240 has a plurality of air holes 243 in the raised portion 244 of its surface at the closed end thereof. A cathode catalytic assembly 230 containing a catalytic composite material 234 (FIG. 2) is placed within the casing proximate to the air holes. During cell discharge, the catalytic material 234 facilitates the electrochemical reaction with ambient oxygen as it ingresses through air holes 243. An adhesive sealant 143 is applied along a portion of the inside surface of cathode casing 240. In a preferred embodiment the adhesive is applied by the method of the invention as a continuous ring on the inside surface of recessed annular step 245 at the closed end 249 of the casing as shown in FIGS. 1 and 7. If the closed end of the cathode casing is flat, that is, does not have a recessed step 245, the adhesive sealant 143 can be applied to the inside surface of the closed end 249 adjacent the outer peripheral edge 248 of said closed end. In such latter case the adhesive sealant 143 is desirably applied as a continuous ring to the inside surface of closed end 249 such that the continuous ring of adhesive 143 has an outside diameter of between about 75 percent and 100 percent, preferably between about 90 and 100 percent, more preferably between about 95 and 100 percent of the inside diameter of closed end 249. A cathode catalytic assembly 230 (FIGS. 1 and 2) can be formed by laminating a layer of electrolyte barrier film material 235, preferably Teflon (tetrafluoroethylene), to one side of the catalytic composite material 234 and an ion permeable separator material 238 to the opposite side. The electrolyte barrier film 235, preferably of Teflon, has the property that it is permeable to air, yet keeps water and electrolyte from passing therethrough. The edge of cathode catalytic assembly 230 can be applied to said adhesive ring 143 on step 245 thereby providing a permanent adhesive seal between the cathode composite 234 and casing step 245. In a specific embodiment the cathode catalytic assembly 230 can be applied to adhesive 143 on step 245 with the electrolyte barrier 235 contacting the adhesive. In a preferred embodiment a separate electrolyte barrier sheet 232, preferably of Teflon, can be applied to adhesive ring 143 on the inside surface of step 245, thereby bonding electrolyte barrier sheet 232 to the inside surface of step 245. The catalytic assembly 230 can then be applied over electrolyte barrier sheet 232, preferably with the surface of second electrolyte barrier sheet 235, preferably of Teflon, contacting the barrier sheet 232 (FIG. 2). The barrier sheet 232 when bonded to the inside surface of step 245, particularly in combination with a second barrier sheet 235 (FIG. 2) being applied against barrier.sheet 232, provides a very effective seal preventing electrolyte from migrating around the edge of catalytic assembly 230 and gradually leaking out of air holes 243. The use of adhesive sealant 143 also reduces the amount of crimping force needed during crimping the outer peripheral edge 242b over the anode casing body. This is particularly advantageous when thin walled casings (thickness between about 0.001 inches (0.0254 mm) and 0.015 inches (0.38 mm)) and thin catalytic cathode assemblies 230 are employed, since high crimping forces could possibly distort or crack such thin casings and cathode assemblies.

A preferred embodiment of a zinc/air cell of the invention is shown in FIG. 1. The embodiment shown in FIG. 1 is in the form of a miniature button cell. The cell 210 comprises a cathode casing 240 (cathode cup) an anode casing 260 (anode cup) with an electrical insulator material 270 therebetween. The insulator 270 can desirably be in the form of a ring which can be inserted over the outside surface of the anode casing body 263 as shown in FIG. 1. Insulator ring 270 desirably has an enlarged portion 273a extending beyond peripheral edge 268 of the anode casing (FIG. 1). The insulator 270 with enlarged portion 273a prevents anode active material from contacting the cathode casing 240 after the cell is sealed. Insulator 270 is of a durable electrically insulating material such as high density polyethylene, polypropylene or nylon which resists flow (resists cold flow) when squeezed.

The anode casing 260 and cathode casing 240 are initially separate pieces. The anode casing 260 and cathode casing 240 are separately filled with active materials, whereupon the open end 267 of the anode casing 260 can be inserted into the open end 247 of cathode casing 240. The anode casing 260 is characterized by having a first straight body potion 263a of maximum diameter which extends vertically downwardly (FIG. 1) from peripheral edge 268 to a point which is more than at least 50% of the anode casing 260 height whereupon the casing is slanted inwardly to form slanted midportion 263b. There is a second straight portion 263c extending vertically downwardly from the terminal end of midportion 263b. The second straight portion 263c is of smaller diameter than straight portion 263a. The portion 263c terminates with a 90° bend forming the closed end 269 having a relatively flat negative terminal surface 265. The body 242 of cathode casing 240 has a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight and can be mechanically crimped over the slanted midportion 263b of the anode casing 260. This locks the cathode casing 240 in place over the anode casing 60 and forms a tightly sealed cell.

Anode casing 260 can be separately filled with anode active material by first preparing a mixture of particulate zinc and powdered gellant material. The zinc average particle size is desirably between about 30 and 350 micron. The zinc can be pure zinc but is preferably in the form of particulate zinc alloyed with indium (100 to 1000 ppm). The zinc can also be in the form a particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants can, for example, be cross linked carboxymethyl cellulose (CMC); starch graft copolymers, for -example in the form of hydrolyzed polyacrylonitrile grafted unto a starch backbone available under the designation Waterlock A221 (Grain Processing Corp.); cross linked polyacrylic acid polymer available under the trade designation Carbopol C940(B. F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 250 can be inserted into the anode casing 260. Alternatively, the dry powder mix of particulate zinc and gellant can be first placed into the anode casing 260 and the electrolyte solution added to form the wet anode mixture 250.

A catalytic cathode assembly 230 (FIGS. 1 and 2) and air diffuser 231 can be inserted into casing 240 as follows: An air diffuser disk 231 (FIG. 1), which can be in the form of an air porous filter paper or porous polymeric material can be inserted into the cathode casing 240 so that lies against the inside surface of the raised portion 244 of the casing against air holes 243. An adhesive sealant ring 143 is applied to the inside surface of recessed step 245 at the closed end of the cathode casing. A separate electrolyte barrier layer 232 (FIGS. 1 and 2), for example, of polytetrafluroethylene (Teflon) can optionally be inserted over the air diffuser 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 2 can be prepared as a laminate comprising a layer of electrolyte barrier material 235, a layer of cathode catalyst composite 234 under the-barrier layer 235 and a layer of ion permeable separator material 238 under the catalyst composite 234, as shown in FIG. 2. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layer 235 can desirably be of polytetrafluroethylene (Teflon). The catalytic assembly 230 can then be applied over electrolyte barrier sheet 232 (FIG. 2), preferably with the surface of barrier (Teflon) sheet 235 contacting the barrier sheet 232.

Catalytic cathode composite 234 desirably comprises a catalytic cathode mixture 233 of particulate manganese dioxide, carbon, and hydrophobic binder which is applied by conventional coating methods to a surface of an electrically conductive screen 237, preferably a nickel mesh screen. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese-.dioxide in catalytic mixture 233 can also be manganese dioxide formed from the thermal decomposition of manganese nitrate $Mn(No_3)_2$. The carbon used in preparation of mixture 233 can be in various forms including graphite, carbon black and acetylene black. A preferred carbon is carbon black because of its high surface area. A suitable hydrophobic binder can be polytetrafluroethylene (Teflon). The catalytic mixture 233 may typically comprise between about 3 and 10 percent by weight $MnO_2$, 10 and 20 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 and method of application herein described is intended to be applicable for use as well in such air assisted cells to prevent leakage of electrolyte therefrom.

After the air diffuser 231 and catalytic assembly 230 are inserted into casing 240 with either barrier layer 235 or alternatively barrier layer 232 adhered to adhesive ring 143, the anode casing 260 is filled with anode material 250. The open end 267 of the filled anode casing 260 can be inserted into the open end 247 of cathode casing 240. The peripheral edge 242b of the cathode casing can be crimped over the slanted midportion 263b of the anode casing with insulator 270 therebetween, as above described.

In the preferred embodiment (FIG. 1) the anode casing 260 has a layer of copper 266 plated or clad on its inside surface so that in the assembled cell the zinc anode mix 250 contacts the copper layer. The copper plate is desired because it provides a highly conductive pathway for electrons passing from the anode 250 to the negative terminal 265 as the zinc is discharged. The anode casing 260 is desirably formed of stainless steel which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 1. Thus, in the assembled cell 210 the copper layer 266 forms the anode casing inside surface in contact with the zinc anode mix 250 and the nickel layer 262 forms the anode casing's outside surface.

The copper layer 266 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 260 composed of the triclad material can be desirably between about 0.001 inches (0.0254 mm) and 0.015 inches (0.38 mm).

A miniature zinc/air cell can then be prepared having the components as above described (FIG. 1) including adhesive ring 143 on the inside surface of step 245. A separate electrolyte barrier layer 232 of Teflon can be bonded to the inside surface of step 245 using adhesive ring 143. By way of a specific example (not intended to be limiting as to cell size), the cell can be a standard size 635 zinc/air cell have an overall diameter of about 0.608 inches (15.4 mm) and a height (positive to negative terminal) of about 0.314 inches (7.98 mm). (Such dimensions are within the standards for such size cell as set by the International Electrochemical Commission —IEC.) The cathode casing 240 can be nickel plated steel having a wall thickness of about 0.01 inches (0.25 mm). The cathode catalyst composite 237 can have the following composition: $MnO_2$ 4.6 wt. %, carbon black 15.3 wt %, Teflon binder 18.8 wt. %, and nickel mesh screen, 61.2 wt. %. The total cathode catalyst composite 237 can be 0.140 g. The anode 250 can contain zero added mercury (mercury content can be less than 20 ppm of cell weight) and can have the following composition: zinc 77.8 wt % (the zinc can be alloyed with 200 to 500 ppm each of indium and lead), electrolyte (40 wt % KOH and 2 wt % ZnO) 21.9 wt. %, gelling agent (Waterlock J-550) 0.3 wt %, lead 400 ppm (0.04 wt %). The total anode 250 can be 2.43 g and the zinc can be 1.9 g.

By way of another specific non limiting example, the cell size could be a standard size 312 zinc/air cell having an outside diameter of between about 0.3025 and 0.3045 inches (7.68 and 7.73 mm) and a height of between about 0.1300 and 0.1384 inches (3.30 and 3.52 mm). The casing 240 wall thickness for both size cells can be, for example, 0.004 inches (0.10 mm). The composition of the 312 size cell can be as above described with reference to the 635 size cell except that the total amount of active material would be adjusted to the volume of the 312 cell size. The process of the invention of applying sealant 143 and the preferred width and thickness of the adhesive sealant (wet and dry) as described in the ensuing description can apply equally as well to such different cell sizes. As above indicated the process of the invention is desirably applicable to miniature zinc/air button cells typically having a disk-like cylindrical shape of diameter between about 4 and 16 mm, preferably between about 4 and 12 mm and a height between about 2 and 9 mm, preferably between about 2 and 6 mm.

Figure 3A:
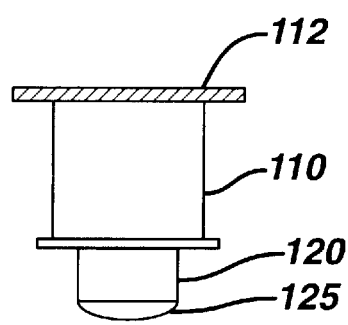
FIG. 3A is an elevation view of the transfer pad in start position.
Figure 3C:
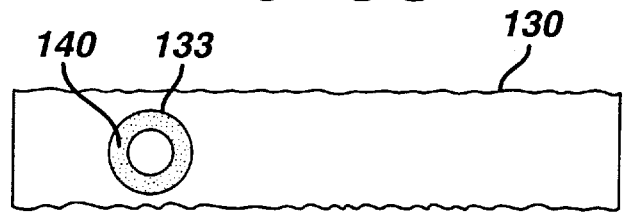
FIG. 3C is a partial plan view of the etched plate showing the etched portion.
Figure 3B:
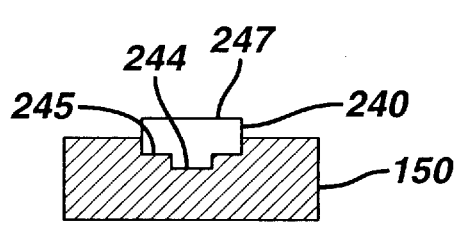
FIG. 3B is a cross sectional view of the cathode casing being held in place within a fixed nest.

In the process of the invention the adhesive sealant 143 is preferably applied as a continuous ring to the inside surface of the cathode casing recessed step 245. An etched plate 130 is prepared with an etched, that is, grooved pattern, in its surface. The etched plate 130 can typically be of steel. The etching can be done using conventional electrochemical methods commonly employed in the printing industry. The etching can be achieved by other methods, for example, by stamping, machining or casting the plate so that the etching or desired pattern of grooves appear on a surface of the plate. The term etched plate as used herein is intended to mean a plate having a grooved pattern on its surface and is not intended to be limited to any particular method of achieving the grooved pattern. The etched ring 133 is preferably formed of a closed (continuous) groove on the surface of plate 130. The groove can be elliptical, oval or circular, and preferably matches the shape of the step 245. Preferably the etched ring 133 has the pattern of continuous circular groove matching the shape of step 245, which is normally circular. The etched ring 133 is desirably between about 20 and 40 micron (0.020 and 0.040 mm) deep, preferably about 30 micron (30 mm) deep. The step 245 in cathode casing 240 desirably has a width of between about 0.025 and 0.035 inches (0.63 and 0.89 mm), for zinc/air cells having a disk-like cylindrical shape of diameter between about 4 and 16 mm, preferably between about 4 and 12 mm, and height between about 2 and 9 mm, preferably between about 2 and 6 mm. Preferably step 245 has a width of about 29 mils (0.74 mm). The etched ring 133 can have a width which is about the same, though no greater than the width of step 245. Preferably the width of etched ring 133 (and therefore also the width of adhesive 143) is less than the width of step 245, desirably between about one third to two thirds of the width of the step, more preferably about one half the width of step 245. In such case the adhesive 143 transferred to step 245 is desirably centered on the step. Thus, if the step 245 has a width of about 29 mils (0.74 mm) the etched ring 133 desirably has a width of about 15 mil (0.38 mm). Cathode casing 240 is placed in inverted position in stationary nest 150 and held immobilized therein as shown in FIG. 3B. Pad 120 is positioned over the open end 247 of cathode casing 240 (FIG. 3A). The adhesive 143 is poured into a dispensing canister 140. The canister 140 is inverted and placed in contact with the surface of etched plate 130 (FIG. 3D.)

Figure 3D:
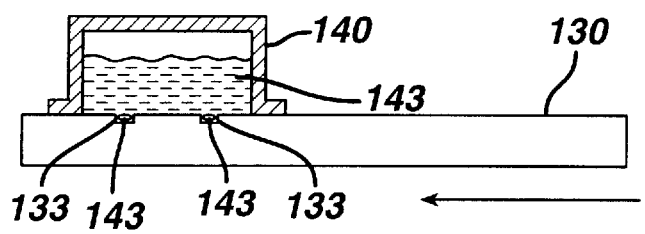
FIG. 3D is an elevation view of the etched plate sliding under a canister used to dispense adhesive.

In the next step of the process the plate 130 is slid horizontally under canister 140 whereupon adhesive 140 fills etched ring 133 as shown in FIG. 3D. (Canister 140 remains in a fixed stationary position throughout the process.) Etched ring 133 is preferably in the pattern of a continuous groove in the surface of plate 130 as shown in FIG. 3C. The plate 130 is slid further under dispensing canister 140, preferably in the same continuous stroke, until the adhesive filled etched ring 133 is aligned under transfer pad head 125. Transfer pad head 125 desirably has a convex curved surface as shown in FIG. 3A which forms the exposed end of transfer pad 120. The transfer pad, desirably of silicon rubber, is available from Innovative Marking Systems, Inc., Lowell, Mass. The transfer pad 120 is held firmly within housing 110 which can be attached to a slideably mounted arm 112. The arm 112 can be actuated to move the pad up and down in the desired timing sequence.

Figure 4A:
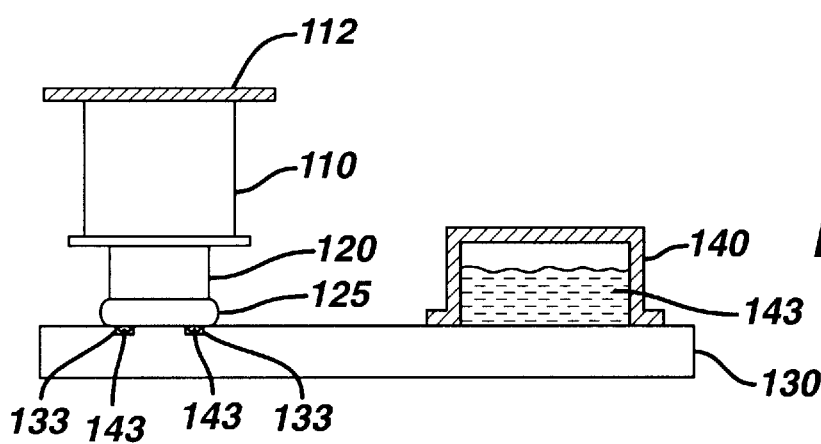
FIG. 4A is an elevation view showing the pad pressing onto the etched plate and picking up adhesive from the etching.
Figure 4B:
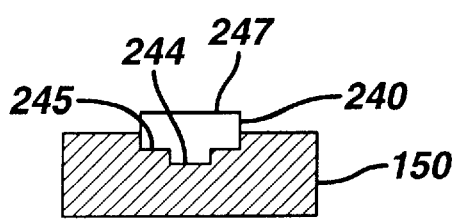
FIG. 4B is a cross sectional view of the cathode casing being held in place within a fixed nest.
Figure 5A:
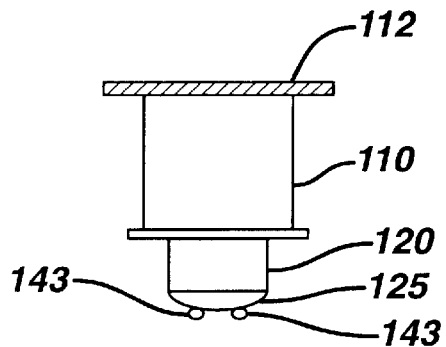
FIG. 5A is an elevation view showing the pad with adhesive thereon after the pad has retracted from the etched plate shown in FIG. 4A.
Figure 5B:
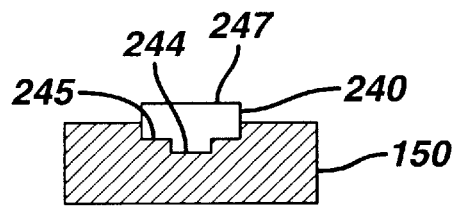
FIG. 5B is a cross sectional view of the cathode casing being held in place within a fixed nest.
Figure 5C:
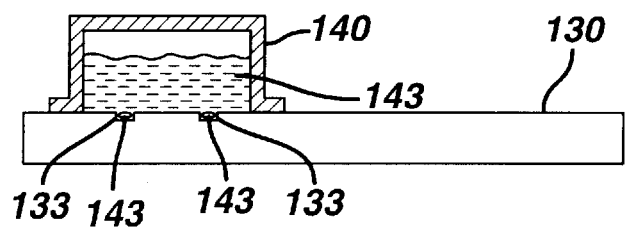
FIG. 5C is an elevation view of the etched plate in retracted position under the canister used to dispense adhesive.

After the etched ring 133 of plate 130 is aligned under pad head 125, pad 120 is moved vertically down until pad head 125 presses against the adhesive filled etching 133 in plate 130 as shown in FIG. 4A. In the meantime the cathode casing 240 is held immobilized in stationary nest 150 (FIG. 4B). The pad is then retracted from the etched plate 130. As the pad is retracted, adhesive 143 is transferred from the etching 133 to pad head 125 as shown in FIG. 5A. The adhesive 143 transfers from etching 133 to the pad as an adhesive pattern conforming to the pattern of etching 133. The cathode casing 240 is still held immobilized in stationary nest 150 as shown in FIG. 5B. After pad 120 retracts from etching 133, the etched plate 130 retracts to the start position as shown in FIG. 5C. The time period between movement of pad head 125 to etched plate and back to start (retract) position can typically be between about 2 and 5 seconds. The transferred adhesive 143 has the same pattern as the etched ring 133 on plate 130.

Figure 6A:
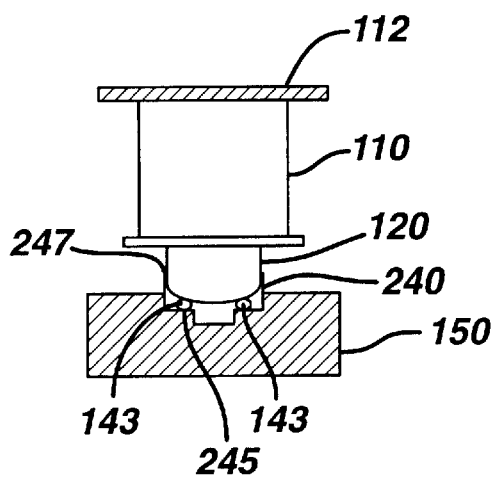
FIG. 6A is an elevation view showing the pad being pressed onto the inside surface of the cathode casing step thereby transferring adhesive from the pad to the inside surface of the casing step.
Figure 6B:
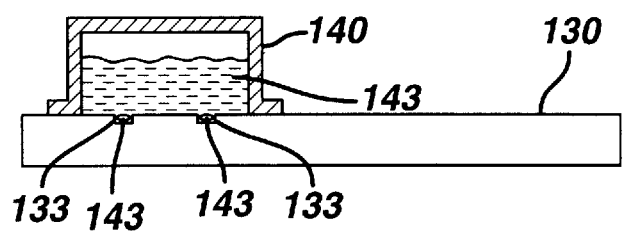
FIG. 6B is an elevation view of the etched plate back in retracted position ready to be passed under the adhesive dispensing canister.

After pad 120 with adhesive transferred thereto is retracted from plate 130, pad 120 is then passed through the casing open end 247 and pressed into contact with a portion of the inside surface of cathode casing 240 as shown in FIG. 6A. The casing 240 is kept immobilized within fixed nest 150 during this step with the casing in inverted position with the inside surface of step 245 facing pad head 125 through casing open end 247. The adhesive pattern 143 on pad head 125 contacts the inside surface of recessed step 245 of casing 240. The pad 120 is then retracted leaving adhesive pattern 143 transferred from pad head 125 to the inside surface of step 245. The time period between movement of pad head 125 onto cathode casing step 245 and back to start (retract) position can typically be between about 2 and 5 seconds. The adhesive 143 transferred to step 245 has the same pattern as etching 133 on plate 130, preferably in the pattern of a continuous circular ring as above indicated. The transferred adhesive is preferably in the form of a continuous ring conforming to the shape and size of the recessed step 245. Thus, the adhesive is desirably applied to the inside surface of the annular step 245 as a continuous ring conforming to the shape of the step. The thickness of the adhesive 143 transferred to the step 245 is the same as the depth-of the etched ring 133, typically about 30 micron ($30 \times 10^{-6}$ meter). After the adhesive is transferred.to step 245 it dries quickly within about 1 to 3 seconds leaving behind a tacky adhesive ring of about 7 to 10 micron thickness on step 245. After the pad 120 is retracted from the casing 240, the etched plate 130 is ready from its start position (FIG. 6B) to be passed under dispensing canister 140 to begin a new cycle. The above described process can be automated so that the adhesive pattern can be applied to individual cathode casings in a continuous manner.

The above described pad transfer process for application of adhesive sealant 143 to step 245 of cathode casing 240 allows for very fine control over the actual amount (thickness and width) of applied adhesive and assures a uniform application in the desired pattern. Specifically, the pad transfer process assures that the adhesive can be applied uniformly in the desired small thickness, e.g. of about 30 micron and small width, e.g. of about 15 mils (0.38 mm) onto step 245 in the desired ring pattern. The pad transfer process for application of the adhesive 143 to cathode casing 240 gives better control over the adhesive amount and placement.of the adhesive onto casing 240 than extrusion methods. The pad transfer process of the invention also alleviates the problem of "stringing" associated with extrusion. Extrusion methods tend leave a fine thread or string of extruded material which clings to the body of the applied adhesive. Such thread of material can become adhered to other portions of the inside of the cathode casing 240 to cause an increase in the cell's internal resistance during discharge.

It will be appreciated that adhesive 143 can be applied in the above described manner simultaneously to a plurality of cathode casings 240. This is readily achieved by etching a plurality of like etched ring patterns side by side on the surface of plate 130. A plurality of like transfer pads can be used to simultaneously pick up the adhesive on the plurality of etched 133 on the surface of plate 130. That is, each of the pads can be aligned with a corresponding adhesive filled etching 133 on plate 130. The pads can be pressed onto their corresponding adhesive filled etching to transfer the adhesive pattern simultaneously from each of the etching to their respective pads. The adhesive 143 can be transferred simultaneously to a plurality of cathode casings 240 by passing the casings simultaneously under their respective pads and pressing each of the pads onto their respective casings 240. In this manner a greater number of cathode casings can be coated with adhesive per unit time than if a single pad were used.

The adhesive to be applied to etching 133 is preferably a solvent based mixture comprising a polyacrylamide based adhesive component. The adhesive component is desirably a low molecular weight thermoplastic polyamide resin. A preferred polyamide resin is available under the trade designation REAMID-100 or VERSAMID-100 (from Henkel Corp. or Cognis Corp.). REAMID-100 or Versamid-100 is a low molecular weight polyamide which is a gel at room temperature. It is as a dimerized fatty acid with a molecular weight of about 390 and is the reaction product of a dimerized fatty acid and diamine. It has a molasses consistency and viscosity of between about 30 and 50 poise at room temperature. The adhesive mixture is easily formed by dissolving the REAMID-100 polyamide in a solvent of isopropanol 50 parts by weight and toluene 50 parts by weight. Another suitable solvent for REAMID-100 can be a mixture of isopropanol 40 parts by weight, toluene 40 parts by weight and butanol 20 parts by weight. Adhesive mixture comprising REAMID-100 and suitable solvent blended to achieve the desired mixture viscosity of about 1100 centipoise can be obtained from Specialty Chemicals Co. The polyamide based adhesive is desirable since it provides a very strong adhesive bond between materials such as Teflon and metal, e.g. between Teflon sheet and nickel plated steel at low adhesive thickness. Specifically the polyamide adhesive layer 143 applied to the inside surface of cathode casing step 245 provides a very strong bond between Teflon sheet 232 and the nickel plated casing (step 245) at low adhesive thickness (e.g., 7 micron thickness after solvent evaporation). The polyamide based adhesive mixture also is desirable since it is resistant to chemical attack from the potassium hydroxide electrolyte. Although higher molecular weight polyamide based adhesive components can be used in the mixture it is desirable to use a lower molecular weight polyamide such as REAMID-100, since such lower molecular weight adhesive is more easily dissolved in the solvent. It is also desired to adjust the adhesive viscosity so that the adhesive being dispensed from canister-140 is neither too thick nor too thin. If the adhesive mixture is too thick gum deposits can form within canister 140 and pass to its open edge.

If the adhesive mixture is too thin not enough of the polyamide adhesive component will be applied to the cathode casing step 245 in which case the desired adhesive bond at low coating thickness may not be achieved. This can cause the canister 140 to hydroplane as the etched plate 130 passes under it. Also if the adhesive mixture is too viscous it may not transfer and stick uniformly to pad head 125 from etched plate 130 and also may not transfer uniformly from pad head 125 to the cathode casing. Thus, the adhesive/solvent mixture viscosity can be adjusted to provide suitable coating properties. A preferred adhesive mixture for application to etching 133 from dispensing canister 140 is desirably a mixture of polyamide adhesive component, preferably REAMID-100 in solvent such that the viscosity of the mixture is about 1100 centipoise. REAMID-100 has the desirable property that it remains tacky for long periods once the adhesive mixture is applied and the solvent evaporates.

A preferred adhesive mixture to be dispensed from canister 140 comprises polyamide gel (REAMID-100) dissolved in a solvent of 50 parts by-weight isopropanol and 50 parts by weight toluene. The adhesive mixture is prepared such that the polyamide gel (REAMID-100) comprises between 50 and 60 weight percent of the total adhesive mixture and said solvent comprises between about 40 and 50 percent by weight of the total adhesive mixture. The viscosity of the mixture is about 1100 centipoise. An alternative preferred adhesive mixture can be prepared with polyamide gel (REAMID-100) dissolved in a solvent of 40 parts by weight isopropanol and 40 parts by weight toluene and 20 parts by weight butanol. The adhesive mixture is prepared such that the polyamide gel (REAMID-100) comprises between 50 and 60 weight percent of the total adhesive mixture and said solvent comprises between about 40 and 50 percent by weight of the total adhesive mixture. These adhesive formulations have the combination of properties that allow the adhesive mixture to be readily transferred in a uniform coat from etched plate 130 to pad head 125 and can be applied as a uniform thin coating from pad head 125 to cathode casing step 245. The formulations allow for sufficient transfer of adhesive solids to the cathode casing 245 to provide a strong bond with the Teflon barrier layer 232 applied thereto. The adhesive mixture dries very quickly, within about 1 to 3 seconds) when applied as a thin coating (e.g. 30 micron) on the inside of step 245. Upon solvent evaporation the dry adhesive provides a uniform coating thickness (e.g. 7 micron) which can remain tacky for long periods of time, for example, up to about one month. Therefore Teflon layer 232 (or 235) can be applied to the adhesive coated step 245 within this lengthy time period without sacrifice in the bonding or sealing property of the adhesive. If the Teflon layer 232 is bonded to the adhesive coated inside surface of step 245 as above described a tight enough seal is provided between the cathode assembly 230 and the cathode casing step 245 to prevent seepage of electrolyte around cathode assembly 230 and into air holes 243.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. A method of applying adhesive to a portion of the inside surface of the cathode casing for a zinc/air cell, comprising:
    applying an adhesive carried by a transfer pad to a portion of the inside surface of said cathode casing and retracting the transfer pad from said casing whereby a portion of the adhesive on the pad remains on the cathode casing.

2. A method of applying adhesive to a portion of the inside surface of the cathode casing for a zinc/air cell, comprising the steps of:
    (a) providing a plate having a groove or etching on its surface,
    (b) filling the groove or etching on the plate with an adhesive forming an adhesive pattern on the plate,
    (c) applying a transfer pad to the adhesive pattern,
    (d) retracting the transfer pad from the adhesive pattern whereby said adhesive pattern transfers to the pad,
    (e) applying the transfer pad to a portion of the inside surface of said cathode casing,
    (f) retracting the transfer pad from the inside surface of said casing whereby the adhesive pattern on the transfer pad transfers to the cathode casing.

3. The method of claim 3 wherein the pad is of silicone rubber.

4. The method of claim 2 wherein the cathode casing is in the form of a can having an open end and a closed end, wherein a central portion of the closed end forms the cell's positive terminal and said positive terminal is surrounded by a recessed annular step, wherein step (e) comprises applying the transfer pad through said open end to contact a portion of the inside surface of said annular step, and step (f) comprises retracting the pad from the inside surface of said annular step whereby the adhesive pattern on the pad transfers to the inside surface of the cathode casing.

5. The method of claim 4, further comprising step (g) applying a portion of an electrolyte barrier sheet to the adhesive pattern on the inside surface of said annular step.

6. The method of claim 5 wherein the electrolyte barrier sheet is of tetrafluoroethylene.

7. The method of claim 4 herein said cell is a button cell and said annular step is an integral portion of the cathode casing.

8. The method of claim 7 wherein the annular step is in the form of an annular ring and the adhesive pattern is in the form of a continuous ring conforming to the shape of said step.

9. The method of claim 4 wherein the adhesive pattern comprises a polyamide.

10. A metal/air depolarized cell comprising an anode casing and a cathode casing, an anode material comprising zinc and alkaline electrolyte within said anode casing, and a catalytic cathode within said cathode casing, wherein the cathode casing is in the form of a can having an open end and a closed end, wherein said closed end has a central portion surrounded by a recessed annular step, said annular step forming a portion of said closed end and said adhesive is applied to the inside surface of said annular step.

11. The metal/air cell of claim 10 wherein the cell is a button cell and said closed end is an integral portion of the cathode casing.

12. The metal/air cell of claim 10 wherein the cell is a button cell and said annular step is an integral portion of the cathode casing.

13. The metal/air cell of claim 10 wherein the cell further comprises and electrolyte barrier sheet having a portion therefor bonded to the adhesive on the inside surface of said annular step.

14. The metal/air cell of claim 13 wherein the electrolyte barrier sheet is of tetrafluoroethylene.

15. The metal/air cell of claim 14 wherein the edge of said barrier sheet is applied to the adhesive on the inside surface of said annular step, wherein the edge of said barrier sheet becomes bonded to the inside surface of said step.

16. The metal/air of claim 15 wherein the adhesive comprises a polyamide.

17. A metal/air depolarized cell comprising an anode casing and a cathode casing, an anode material comprising zinc and alkaline electrolyte within said anode casing, and a catalytic cathode within said cathode casing, wherein the cathode casing is in the form of a can having an open end and a closed end, wherein said closed end has a central portion surrounded by a recessed annular step, said annular step forming a portion of said closed end and said adhesive is applied to the inside surface of said annular step, wherein the adhesive is in the form of a continuous ring conforming to the shape of said annular step.

18. A metal/air depolarized cell comprising an anode casing and a cathode casing, an anode material comprising zinc and alkaline electrolyte within said anode casing, and a catalytic cathode within said cathode casing, wherein the cathode casing is in the form of a can having an open end and a closed end, wherein said closed end has a central portion surrounded by a recessed annular step, said annular step forming a portion of said closed end and wherein an adhesive is applied to a portion of the inside surface of said closed end, wherein the cell further comprises an electrolyte barrier sheet having a portion thereof bonded to the adhesive on the inside surface of said closed end.

19. A cathode casing for a metal/air depolarized cell wherein the cathode casing is in the form of a can having an open end and a closed end wherein said closed end has a central portion surrounded by a recessed annular step, said annular step forming a portion of said closed end and said adhesive is applied to the inside surface of said annular step.

20. The cathode casing of claim 19 wherein the casing is cylindrical and said closed end is an integral portion of the cathode casing.

21. The cathode casing of claim 19 wherein the metal/air cell is a zinc/air cell.

22. The cathode casing of claim 19 wherein the adhesive comprises a polyamide.

23. A cathode casing for a metal/air depolarized cell wherein the cathode casing is in the form of a can having an open end and a closed end, wherein said closed end has a central portion surrounded by a recessed annular step, said annular step forming a portion of said closed end and said adhesive is applied to the inside surface of said annular step, wherein the adhesive is in the form of a continuous ring conforming to the shape of said annular step.

24. A cathode casing for a metal/air depolarized cell wherein the cathode casing is in the form of a can having an open end and a closed end wherein a central portion of said closed end is surrounded by a recessed annular step, said annular step forming a portion of said closed end and said adhesive is applied to the inside surface of said annular step, wherein the cell further comprises a electrolyte barrier sheet having a portion thereof bonded to said adhesive on the inside surface of said annular step.

25. The cathode casing of claim 24 wherein the cell further comprises an electrolyte barrier sheet having a portion thereof bonded to the adhesive on the inside surface of said annular step.

26. The cathode casing of claim 25 wherein the electrolyte barrier sheet is of tetrafluoroethylene.

27. The cathode casing of claim 26 wherein the edge of said barrier sheet is applied to the adhesive on the inside surface of said annular step, wherein the edge of said barrier sheet becomes bonded to the inside surface of said annular step.

28. The cathode casing of claim 27 wherein a catalytic cathode comprising manganese dioxide is applied over said electrolyte barrier sheet so that said barrier sheet is between the inside surface of said annular step and the catalytic cathode.

* * * * *